June 12, 1923.

H. L. TANNER 1,458,601

ELECTRODYNAMIC TRANSMISSION SYSTEM FOR VEHICLES

Filed Feb. 5, 1917     5 Sheets-Sheet 1

INVENTOR
HARRY L. TANNER.
BY
Herbert H. Thompson
ATTORNEY

June 12, 1923.
H. L. TANNER
1,458,601
ELECTRODYNAMIC TRANSMISSION SYSTEM FOR VEHICLES
Filed Feb. 5, 1917
5 Sheets-Sheet 2
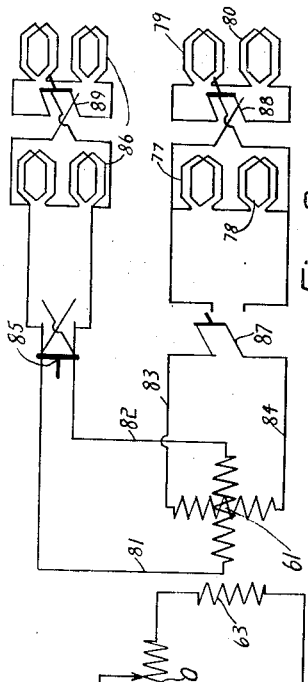
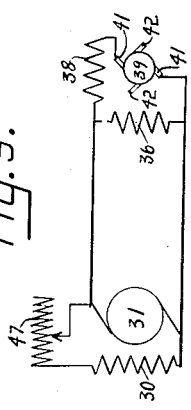
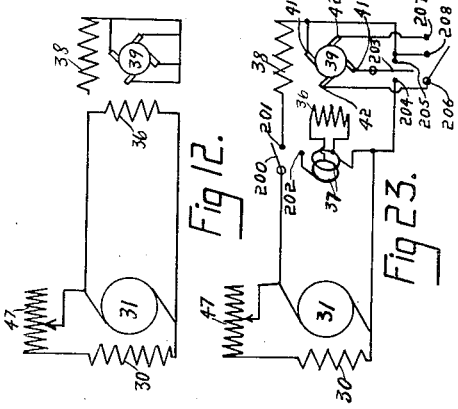
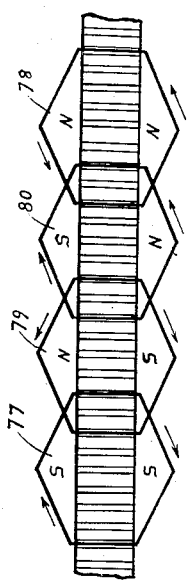
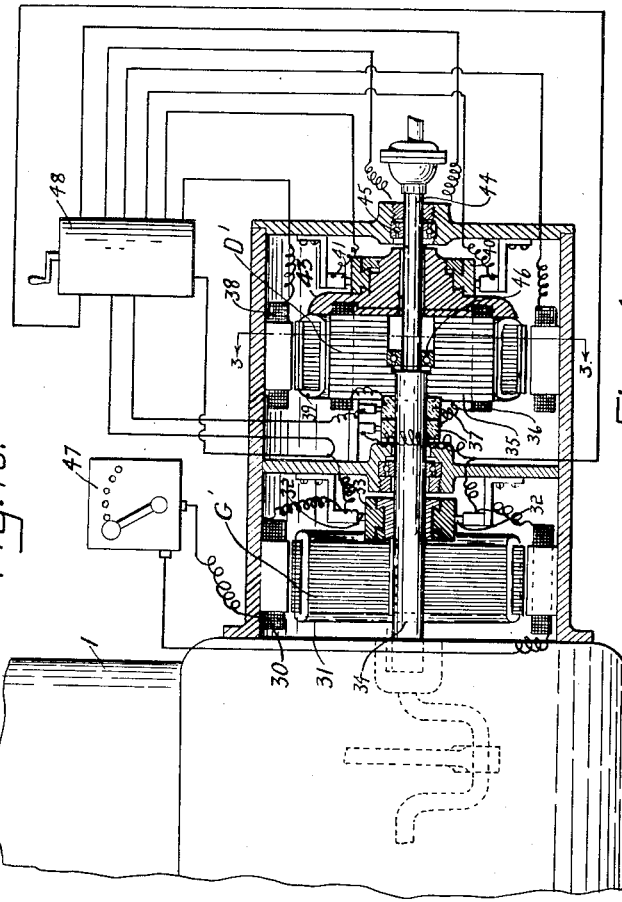
INVENTOR
*HARRY L. TANNER*
BY
*Herbert H. Thompson*
ATTORNEY

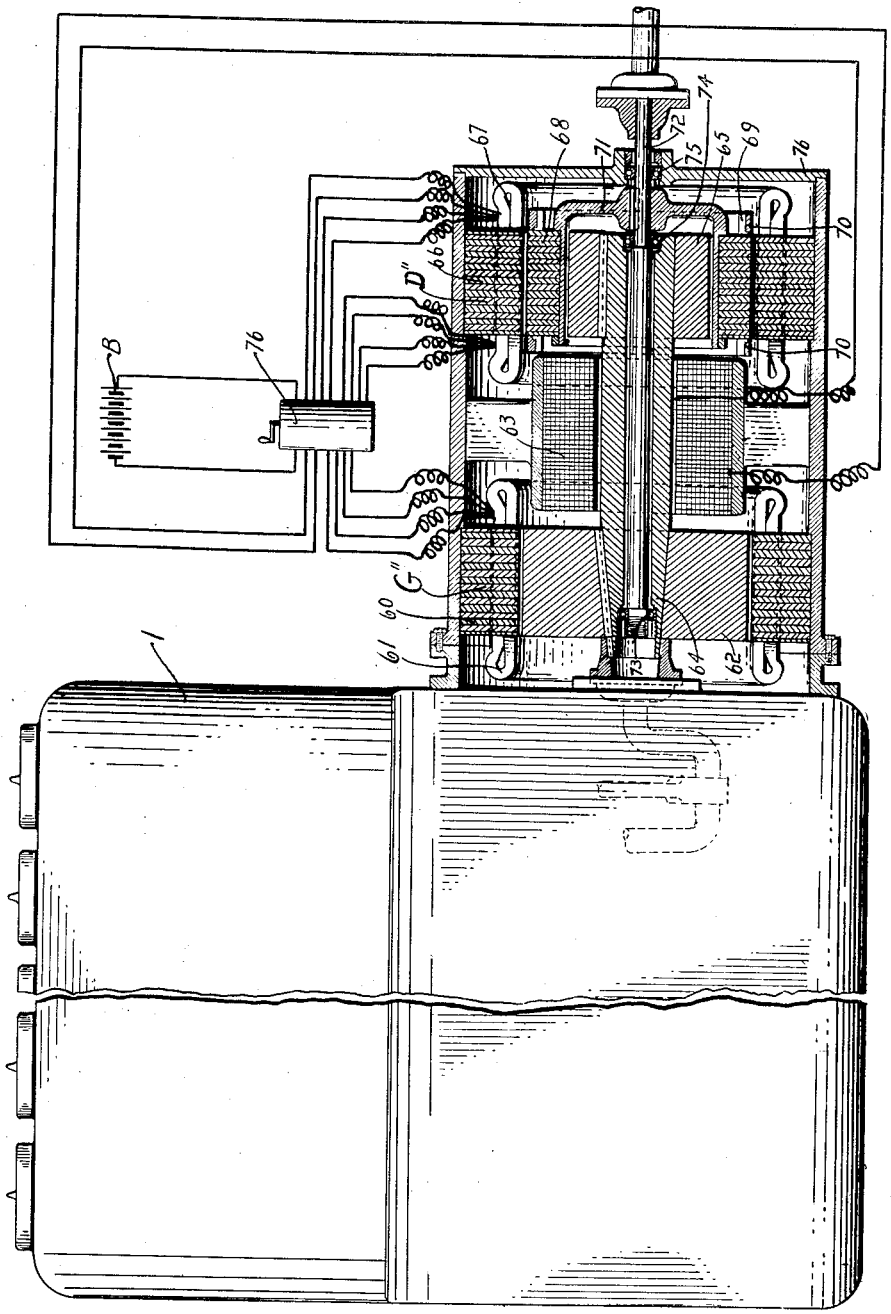

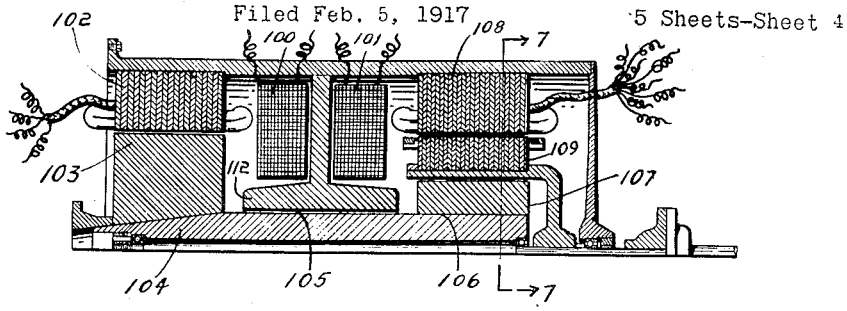
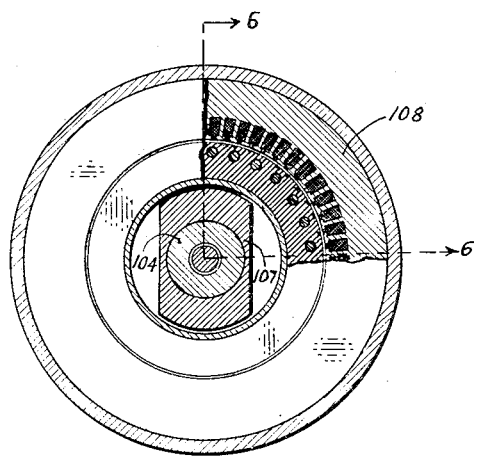
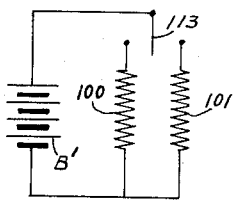
Fig. 7.
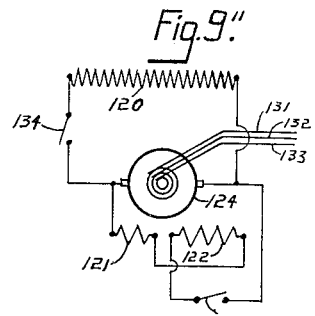
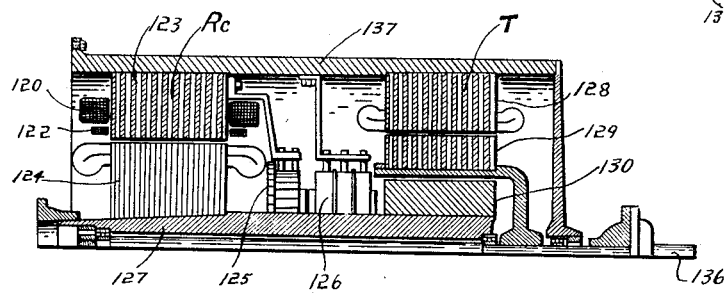
Fig. 8.
INVENTOR
HARRY L. TANNER
BY
Herbert H. Thompson
ATTORNEY June 12, 1923.

H. L. TANNER 1,458,601

ELECTRODYNAMIC TRANSMISSION SYSTEM FOR VEHICLES

Filed Feb. 5, 1917    5 Sheets-Sheet 5

INVENTOR
HARRY L. TANNER.
BY
Herbert H. Thompson
ATTORNEY

Patented June 12, 1923.

1,458,601

UNITED STATES PATENT OFFICE.

HARRY L. TANNER, OF BROOKLYN, NEW YORK.

ELECTRODYNAMIC TRANSMISSION SYSTEM FOR VEHICLES.

Application filed February 5, 1917. Serial No. 146,556.

*To all whom it may concern:*

Be it known that I, HARRY L. TANNER, a citizen of the United States of America, residing at 1144 East 19th Street, Brooklyn, in the county of Kings and State of New York, have invented certain new and useful Improvements in Electrodynamic Transmission Systems for Vehicles, of which the following is a specification.

This invention relates to electro-dynamic means for transmitting power especially adapted for use in self-propelled vehicles driven by internal combustion motors. The main object of my invention is to provide a system in which the transmission is accomplished by a generator-motor drive for low speeds and by electro-magnetic drag for higher speeds of the driven element and in which but two dynamo electric machines are employed. Further objects are to employ the same machines used in transmission for charging a secondary battery, starting the prime mover and braking the driven element.

I attain these objects by employing two dynamo-electric machines, one a generator driven by the prime mover and the other a machine or translating device, of peculiar construction, comprising a field element, an armature element and a member of magnetizable material driven through a mechanical coupling by the prime mover. The last mentioned machine is in effect two machines combined in one so that the space occupied thereby is comparatively small. Referring to the drawings, which illustrate what I now consider the preferred forms of my invention:

Figs. 3 and 4 illustrate a modified form of my invention, Fig. 4 being a longitudinal section and Fig. 3 being taken on the line 3—3 of Fig. 4.

Fig. 5 is a longitudinal section of another modification of my invention.

Figs. 6 and 7 illustrate a slight modification of the form of my invention illustrated in Fig. 5; Fig. 6 being a section taken on line 6—6 of Fig. 7 and Fig. 7 being a section taken on line 7—7 of Fig. 6.

Fig. 8 is a view similar to Fig. 6 but illustrating a still further modification of my device.

Figure 1:
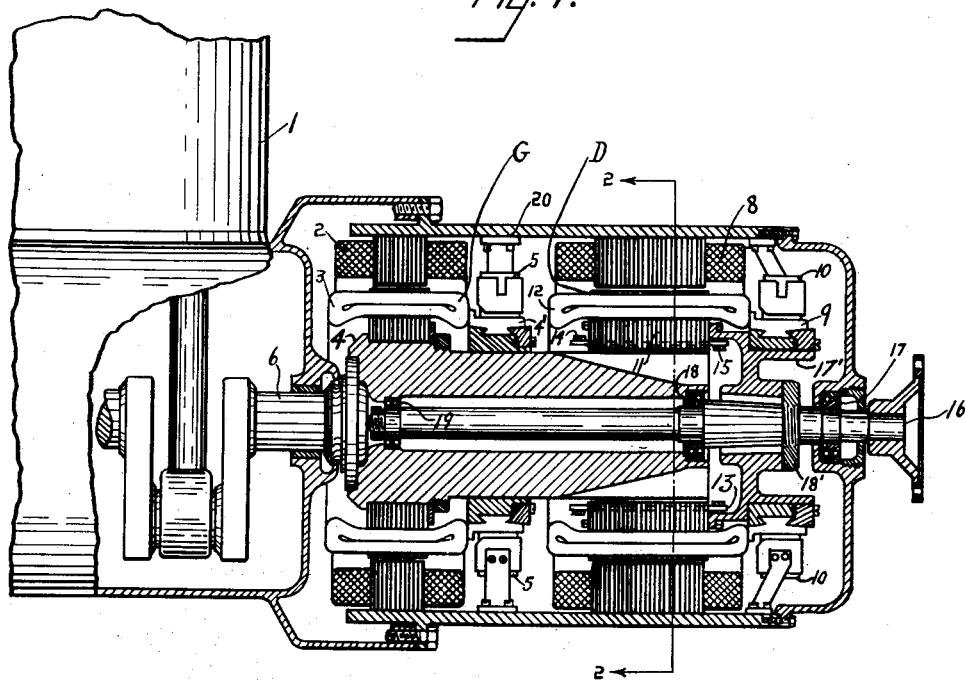
Fig. 1 is a longitudinal section of what I consider at this time the preferred form of my transmission system.
Figure 2:
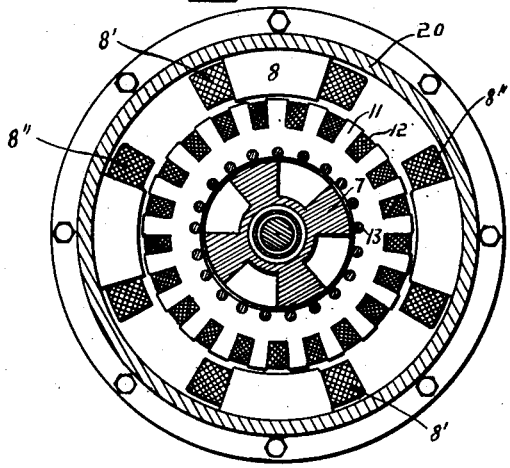
Fig. 2 is a section taken on the line 2—2 of Fig. 1.
Figure 24:
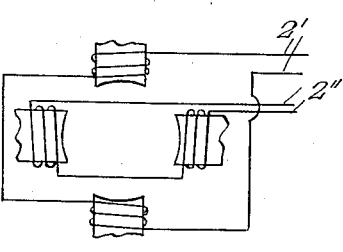

Figs. 9 to 24 inclusive are diagrammatic views of the electrical connections of the various forms of my invention, Figs. 9 and 10 relating to the form of apparatus shown in Fig. 5, Fig. 9' to that shown in Figs. 6 and 7, Fig. 9" to that shown in Fig. 8, Figs. 11, 12 and 23 to that shown in Figs. 3 and 4, and Figs. 13 to 22 inclusive and Fig. 24 to that shown in Figs. 1 and 2.

Referring to Figs. 1 and 2 it will be seen that the prime mover 1, shown as an internal combustion motor for the purpose of illustration, supports a generator G and a dynamo-electric machine or translating device D. The generator comprises the usual field 2, armature 3, commutator 4' and brushes 5 and while I am aware that the field can be made the rotating part I have, for the purpose of illustration shown the armature as the rotating element, said armature 3 being fixedly secured to the sleeve 4 of magnetizable material which sleeve in turn is driven from the engine 1, as by being secured to the power shaft 6 of the prime mover. The sleeve member 4 at the end remote from the generator G carries any suitable number of poles 7, clearly shown in Fig. 2 and these poles 7 constitute what I term the rotatable member of the dynamo-electric machine or translating device D. The device D comprises also the usual field 8, commutator 9, brushes 10 and a rotatable element 11 which carries the usual armature winding 12 and a squirrel cage winding 13 the short-circuiting rings of which are shown as 14 and 15 in Fig. 1. The rotatable element 11 is secured to the shaft 16 by any suitable means such as spider 17' and nut 18'. As shown the element 11 is in the form of a hollow cylinder or annulus surrounding the poles 7 of the sleeve member. The armature winding 12 cooperates with the field 8 at certain times to form a D. C. motor while the squirrel cage winding, which is located adjacent the poles 7, cooperates with the latter when they are effectively magnetized and rotating to be dragged around thereby. Thus, in effect, the translating device D is two machines, the element 11 serving both as the armature of an ordinary motor and also as one of the elements of a magnetic drag coupling. The shaft 16, which receives transmitted power from the prime mover and which may be termed the driven member is journaled in suitable bearings, here shown as ball bearings 17, 18 and 19. It will be noticed that the sleeve 4 and shaft 16 are in effect telescoping shafts, bearings 18 and 19 being mounted within the sleeve 4.

The electrical connections and operation of the form of my invention illustrated in Figs 1 and 2 may best be understood by reference to Figs. 13 to 22 inclusive, it being understood of course, that these figures are merely diagrammatic. As shown in Figs. 13 to 22 the field winding of the generator and likewise the field winding of the device D are preferably each made up of two sections. Thus the field winding 2 of the generator G is made up of two sections 2' and 2'', the section 2' preferably comprising the coils of alternate poles and section 2'' comprising the coils of the poles located between the aforementioned alternate poles. (See Fig. 24.) The field 8 of the device D is made up in two sections 8' and 8'' similar to the field of the generator G above described.

Figure 13:
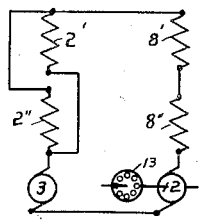

The operation of the part of my invention described up to this point is as follows. Assuming that the prime mover is running and it is desired to transmit motion to shaft 16, the connections shown in Fig. 13 are made in which device D acts as a D. C. motor and in which the sections of the field of the generator while aiding each other are connected in parallel so that the generator field and consequently the generated E. M. F. does not have its maximum strength. The motor field sections 8', 8'' on the other hand are not only aiding each other but are connected in series so that the motor field has its maximum strength for any constant current. Thus the speed of the armature 12 is low and the torque high for two reasons, i. e. due to the comparatively low E. M. F. impressed on the terminals of the motor and due also to the strength of the motor field.

Figure 14:
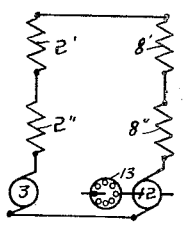

In order to accelerate the shaft 16 the connections of the generator field sections are changed to those shown in Fig. 14 it being obvious from inspection of this figure that the motor connections are unchanged but the generator field sections are in series and aiding each other so that the speed of the shaft 16 will now be approximately double that of said shaft with the connections as made in Fig. 13 due to the fact that the E. M. F. impressed on the motor is practically doubled. Thus if the parts are so designed that the speed of the shaft 16, with the connections as made in Fig. 13, is one-sixth full speed, the speed of the same shaft will be approximately one-third full speed with the connections as made in Fig. 14, the speed of the prime mover being constant.

Figure 15:
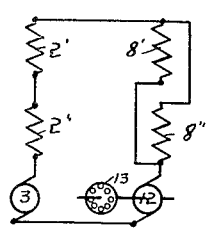

To speed up the shaft 16 still more the motor field sections are connected in parallel and aiding each other, as shown in Fig. 15 the connections of the generator remaining as shown in Fig. 14. The motor field is thus weakened and the speed of the shaft 16 will pick up to approximately two-thirds full speed.

Up to this point it will be observed that machines G and D act as two distinct machines, i. e., as a strict generator and motor drive the only connection between them being the electrical conductors. I wish to call attention to the fact that no magnetic flux has passed through the sleeve 4 up to this point in the operation as the path of the flux in each machine is merely through the field and armature cores of such machine. Furthermore, while I am aware that the machines could be operated as shunt or compound wound machines up to this point I have illustrated them as operating as series machines as this form is perhaps preferable. Obviously other methods of speeding up the motor armature shaft would occur to a person skilled in the art, and may be employed without departing from this invention.

The next step in the speeding-up process is as follows: The connections of the machines are changed to those shown in Fig. 16. The armature winding 12 is now out of the circuit and the two sections of the field 8 are connected in such a manner as to produce field poles all of the same polarity. By so connecting the sections 8', 8'' the flux produced by these sections instead of passing only through the field poles of device D and the armature thereof now passes along the following path: through the field poles of D, the armature thereof, poles 7, sleeve 4, the armature and field of generator G and thence through the frame 20 back to the field poles of device D. Thus it will be seen that magnetic flux will either be passed through or diverted from the member 4 of magnetic materal depending on how the sections of the field winding of the device D are connected. Obviously the magnetic flux passing through sleeve 4 will concentrate at the poles 7 so that when said sleeve is rotated lines of force will cut the bars 13, an E. M. F. will be thereby produced and as the bars are short-circuited current will flow therein and will produce a torque between element 11 and member 4 and consequently the element 11 will be rotated by the sleeve 4 at a speed slightly less than that of the said sleeve (due to slip). The effect of the change of the flux path will now be considered with relation to its effect on the generator field.

Figure 16:
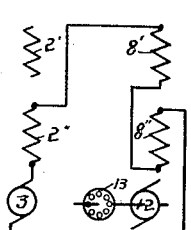
Figure 16A:
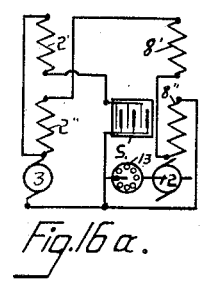

As shown to the left of Fig. 16 one of the sections of the generator field is now idle being cut out of the circuit and that one of the sections 2′ or 2″ is utilized which will impress a polarity on its poles which is opposite to that of all of the field poles of the device D. Let it be assumed, by way of example, that all of the poles of the device D are now north poles then that section 2′ or 2″ on the generator will be utilized which will cause the poles on which this section is mounted to be south poles. The flux through these latter poles is made up of two components one being the flux produced by their own winding and the other, that produced by the field winding of the device D and these two fluxes being in the same direction the resultant flux through the poles on which the energized section is located will be greater than either component. The other poles of the generator field will have a flux passing through them equal to the algebraic sum of the flux produced by the field winding of the device D and the flux due to the active winding on the other poles of the generator field. Obviously these are in opposition and as the former is larger the resultant flux will be in the same direction as that of the poles on which the active winding is located but will be smaller in value. In short although the field poles of the generator are now of the same polarity they differ in strength, the poles on which the energized section of the field winding 2 is located being stronger than that of the remaining poles. Due to this change of flux the E. M. F. of the generator G is materially reduced but is sufficient to impress the proper M. M. F. on the motor field and also to furnish current for other uses such as charging batteries, etc.

Figure 17:
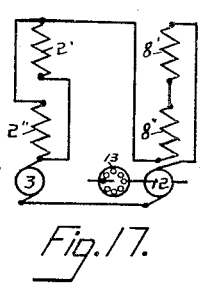
Figure 18:
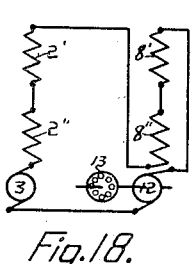

The direction of rotation of the shaft 16 can be reversed by making the connections shown in Figs. 17 and 18, or connections similar thereto. These figures are identical with Figs. 13 and 14 respectively except that the motor field is reversed thereby reversing the direction of rotation of the element 12. While I am aware that the shaft 16 could be driven in a reverse direction at a speed equal to that given by the connections shown in Fig. 15 by simply reversing the field 8 in Fig. 15 I have not illustrated such arrangement for the reason that two reverse speeds are perhaps sufficient.

While I have illustrated the field of the translating device D as comprising four poles I do not wish to be restricted to this number as obviously any suitable number of poles may be used both in device D and generator G. Furthermore, although I am aware that the poles 7 could be carried by element 11 and the squirrel cage winding by the sleeve 4, I prefer to illustrate the reverse of this arrangement.

As my device is designed especially for use on motor vehicles the generator G, besides being used as already described may be used to charge a secondary battery, to operate as a motor for starting the prime mover and to supply electrical energy, when the system is utilized to perform a braking function as will be more fully described.

Figure 19:
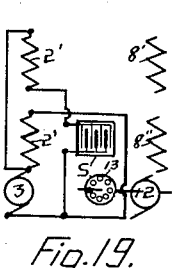

While the generator G is being driven by the prime mover but is idle it is adapted to be used to charge a secondary battery S the connections being diagrammatically shown in Fig. 19. From inspection of this figure it is obvious that one of the field sections 2″ is acting as a shunt field while the section 2′ is in series with the storage battery S which is the load. The section 2′ as shown, opposes the section 2″ and the latter is the stronger. Obviously the voltage now generated is lower than that generated by the same generator G with its field sections 2′, 2″ aiding each other, and this low voltage is used to charge the battery S. Although there would be a small amount of flux passing from the field of generator G, through sleeve 4, core 11, the field of the device D and back to the generator, due to the fact that the field sections 2′ and 2″ are in opposition with the connections as shown in Fig. 19 and the machine G acting as a generator, this flux is negligible from the standpoint of creating torque between element 11 and poles 7 especially in view of the fact that in practice the field section 2″ may, if desirable, be shunted by a low resistance whenever the battery is being charged. Thus by closing a switch 2$^b$ (see Fig. 19$^a$), the resistance 2$^a$ may be shunted across section 2″.

The generator G is also adapted to be used to charge the battery S when the system is connected as in Fig. 16 or in a similar manner and also when the system is used as a brake as shown diagrammatically in Fig. 21, to be more fully described hereinafter. Fig. 16$^a$, shows the generator G acting both to charge the battery S and to supply current to field sections 8′, 8″. Here while the section 2″ is not as strongly energized as in Fig. 19 it is nevertheless stronger than section 2′ which opposes it. While all of the poles of the generator G are now of the same polarity one set of alternate poles is weaker than the remaining poles so that an E. M. F. will be generated by the machine G sufficient to properly energize sections 8′, 8″ and to charge the battery.

The generator G is operated as a motor to start the prime mover by making the connections shown diagrammatically in Fig.

20 or connections similar thereto. The generator G now acts as a motor, supplied by the battery S, and drives the shaft 6.

The connections shown in Fig. 19 may also be utilized to start the prime mover, the machine G then acting as a motor to drive the engine and being supplied by the battery S. It is obvious that with these connections and with the machine G acting as a motor, the field sections 2' and 2" are aiding each other so that a comparatively large torque is obtained.

Figure 21:
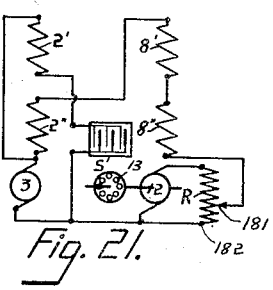
Figure 19A:
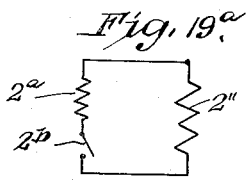

The operation of the generator G in performing its battery charging function in Fig. 21 is substantially the same as in Fig. 19 as the connections of the machine G are the same in Figs. 19 and 21 except that field 8 is energized in Fig. 21 by being placed in series with the section 2" in order to separately excite the machine D.

As has been previously mentioned the generator G and device D are adapted to operate to exert a braking action on the shaft 16. One form of connection for accomplishing this result is illustrated in Fig. 21. The generator G now acts not only to charge battery S but to separately excite the field 8 of the machine D now acting as a separately excited generator driven by the shaft 16. The resistance R constitutes the load on the machine D. Let it be assumed that the current is flowing down in the field 8', 8", then the current due to the E. M. F. generated in armature 12 will be flowing down in resistance R. Due to this last mentioned current there will be an I R drop from 181 to 182 which obviously opposes the E. M. F. impressed on field sections 8', 8" by the generator G and consequently the field 8 of the device D will be weakened by an amount directly proportional to the current flow through armature 12. The braking effect of the device D is directly proportional to the load on said device which is in turn directly proportional to the current flow. Therefore, with the connections as shown in Fig. 21, or connections similar thereto, if the braking effect becomes too heavy, the field 8', 8" will be weakened cutting down the E. M. F. generated in armature 12 and consequently reducing the braking effect.

Figure 22:
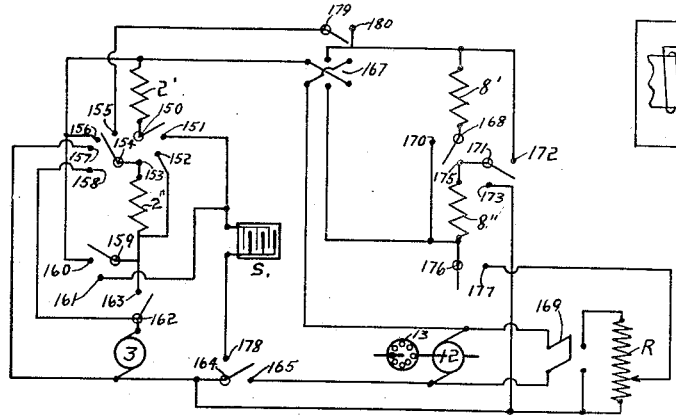

While I do not intend to limit myself to any one use of my invention, I have shown a complete diagrammatic view (Fig. 22) of a preferred form of the system as designed to be used on a motor vehicle. The showing in Fig. 22 is purely diagrammatic and is intended to be illustrative merely of one way of changing the machine connections in order that the various functions can be performed by machines G and D. While I am aware that the various switching operations would be performed in practice by a suitable controller I have shown diagrammatic switches only in Fig. 22 as the specific controller used is not regarded as a part of the present invention.

Figure 20:
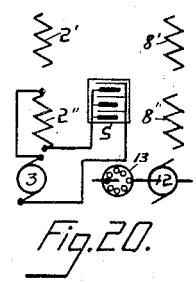

In Fig. 22, switches 150, 154, 159, 162, 164, 167, 168, 171, 176, 179 and 169 are shown diagrammatically. Switch 150 is adapted to engage any one of contacts 151, 152 or 153; switch 154 any one of contacts 155, 156, 157 or 158; switch 159 either one of contacts 160 or 161; switch 162, contact 163; switch 164 either of contacts 165 or 178; switch 168 either of contacts 170 or 175; switch 171 either of contacts 172 or 173; switch 176 contact 177; switch 179 contact 180; switch 169 is a double pole, single throw switch and switch 167 is a reversing switch. The remaining elements have been described in connection with the preceding figures and will be readily recognized. To form the various connections illustrated in Figs. 13 to 21 inclusive the following switches must be closed, it being assumed that all switches not specifically mentioned are open. To form the connections illustrated in Fig. 13, switch 162 is moved to engage contact 163; switch 150 to engage contact 152; switch 154 to engage contact 156; switch 164 to engage contact 165; switch 167 is thrown to the left and switch 168 moved to engage contact 175. To form the connections illustrated in Fig. 14 switch 162 engages contact 163; switch 150 contact 153; switch 164 contact 165; switch 167 to the left and switch 168 engages contact 175. To form the connections shown in Fig. 15 switch 162 engages contact 163; switch 150 contact 153; switch 164 contact 165; switch 167 is to the left; switch 168 engages contact 170 and switch 171 contact 172. The connections shown in Fig. 16 are formed as follows: Switch 162 engages contact 163; switch 154 contact 155; switch 179 contact 180; switch 168 contact 170 and switch 171 contact 173. Exactly the same switches as were closed to form the connections shown in Fig. 16 are closed to form the connections shown in Fig. 16ª and in addition to these the following switches are closed: 164—178; 150—151 and 159—160. The positions of the switches to form the connections shown in Figs. 17 and 18 are the same as the positions of the switches in forming the connections shown in Figs. 13 and 14 respectively except that the switch 167 is thrown to the right. To form the connections shown in Fig. 19 switch 162 engages contact 163; switch 154 contact 157; switch 159 contact 160; switch 150 contact 151 and switch 164 contact 178. The connections shown in Fig. 20 are formed as follows: switch 154 engages contact 158; switch 159 contact 161 and switch 164 contact 178. To form the connections shown in Fig. 21 switch 162 engages contact 163; switch 154 contact 155; switch 179 contact 180; switch 168 contact 175; switch 159 contact 160; switch 150 contact 151; switch 164 contact 178; switch 176 contact 177 and switch 169 is closed.

Figure 3:
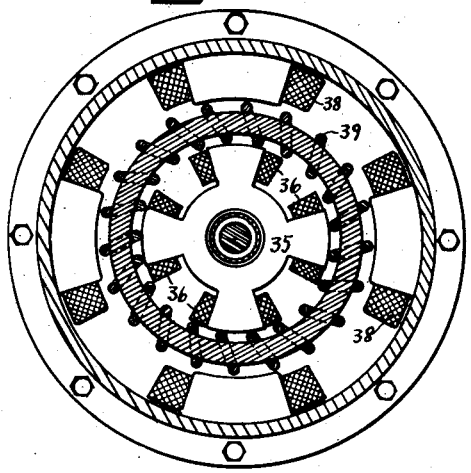

Figs. 3 and 4 illustrate a modified form of my invention in which the generator G' and translating device or dynamo-electric machine D' while arranged in juxta-position need not be so arranged as the magnetic paths of these two machines are at all times distinct. The generator G' comprises the usual field 30, armature 31, brushes 32, commutator 33 and armature shaft 34, the armature being shown as the rotating element merely for the purpose of illustration. The shaft 34 is coupled with the prime mover 1 in any suitable manner to be driven thereby, the shaft 34 being shown as a prolongation of the engine shaft. The member 35 which is of magnetizable material of any suitable number of poles and which forms one of the elements of the translating device D' is also coupled to the shaft 34 to be rotated thereby. The member 35 carries a winding 36 connected to slip rings 37 which are rotatable with said member. The device D' comprises also the usual field 38 and armature 39 of the Gramme ring type, the commutator 40 the usual number of brushes 41 to operate the armature as a D. C. motor armature, and an additional number of brushes 42 spaced ninety electrical degrees from the first mentioned brushes for a purpose to be described later. The armature 39 is fixedly mounted on shaft 44 as by means of the spider 43, the said shaft 44 being independently rotatable with reference to the shaft 34 and being suitably journaled as for example in ball bearings 45 and 46, the latter being mounted on the interior of the member 35. The shaft 44 receives power transmitted from the prime mover 1. Any suitable means may be employed for controlling the E. M. F. of the generator G', the means illustrated being a field rheostat 47. For controlling the various circuits of the machines I have shown a controller 48 but as the specific form of controller does not form a part of the present invention I do not show it in detail.

To understand the operation of this form of my invention attention is directed to Figs. 11, 12 and 23. Assuming that the engine is running and that it is desired to transmit motion to the shaft 44 the connections shown in Fig. 11 are made in which the dynamo G' is acting as a generator and supplying power to the device D' acting as a D. C. motor. The armature or rotating element 39 should be started at comparatively low speed then brought up to a higher speed and while I am aware that there are numerous methods for accomplishing this I have, by way of example, illustrated a field rheostat in the generator circuit. Obviously by means of the field rheostat the E. M. F. impressed on the motor and consequently the speed of the latter can be controlled.

To speed up the shaft 44 still more the connections are changed to those shown in Fig. 12 in which the field 38 of the device D' is cut out, the winding 36 connected to the generator and the brushes 41, 41 short-circuited. With these connections made the member 35 is magnetized and when rotating its field cuts the conductors on armature 39 to set up an E. M. F. in them which, as the brushes 41, 41 are short-circuited produces a current flow and a torque between the member 35 and the armature 39. Thus the armature 39 may be rotated by member 35 at a speed equal to that of said member (disregarding slip). It will be noted that, as the field 35 rotates and the brushes 41 are stationary the E. M. F. across said brushes 41, 41, will be alternating and as a consequence the torque will be pulsating. To render this torque more uniform I provide an additional set of brushes 42, 42 spaced ninety electrical degrees from the brushes 41, 41 and these brushes 42, 42 are also short-circuited as shown in Fig. 12.

As has been previously pointed out the specific controller used to perform the various switching operations forms no part of the present invention and for that reason is not illustrated in detail. I illustrate in Fig. 23 one simple arrangement of switches to form the connections illustrated in Figs. 11 and 12 it being understood of course that the showing in Fig. 23 is purely diagrammatic. To form the connections illustrated in Fig. 11 switch 200 is closed on contact 201 and switch 203 is closed on contact 204, switch 206 remaining open. To form the connections shown in Fig. 12 switch 200 is closed on contact 202, switch 203 is closed on contact 205 and switch 206 is closed on contacts 207 and 208.

Fig. 5 shows another modification of my invention in which alternating current machines are utilized. The generator G'' is preferably a polyphase one being illustrated as two phase and comprising the usual armature 60, carrying the winding 61, and a field 62, which is shown as the rotating element of the generator G'' and which has any suitable number of poles excited by the winding 63 surrounding the sleeve 64. While this winding 63 could rotate with the sleeve 64, I have shown it as being stationary with respect to said sleeve. The sleeve 64, of magnetizable material, carries the field 62 of the generator and is coupled with the prime mover to be driven thereby. The member 65, of magnetizable material, has any suitable number of poles (similar to the poles 7 in Fig. 2) and is carried by the sleeve 64. The translating device or dynamo-electric machine D'' comprises the member 65 and elements forming the primary and secondary of an induction motor. The primary is illustrated as stationary and comprises core 66 and winding 67. The secondary or rotor 68 carries a squirrel cage winding of which the bars are designated as 69 and the short-circuiting rings as 70. The rotor 68 is connected to the load, as in the other forms of the invention and surrounds or is placed magnetically close to member 65 driven by the engine. Rotor 68 is shown as fixedly connected by means of the spider 71 to the driven member or shaft 72. The shaft 72 is journaled in suitable ball bearings 73, 74, 75 of which the two first mentioned are mounted in the sleeve 64. Thus the shaft 72 telescopes into but is rotatable with respect to the sleeve 64.

The electrical connections may best be understood by inspection of Fig. 9. The generator G''', as previously stated, is shown as a two phase one the terminals of one phase being connected to leads 81 and 82 while the terminals of the other phase are connected to leads 83, 84. I wish it to be understood that the switches in Fig. 9 hereinafter referred to are illustrated in a purely diagrammatic manner and all of the operations performed by these switches are preferably to be performed by a controller indicated generally at 76. The leads 81, 82 are connected through a reversing switch 85 to one phase 86 of the stator winding 67 of device D'' and the leads 83, 84 are connected through a switch 87 to the other phase of said winding. Although there are various ways of changing the speed of a squirrel cage motor I illustrate the following method:

The two phases of the winding 67 are similar so that a description of the lower one in Fig. 9 will suffice for both. This phase comprises two groups of coils, one group comprising coils 77 and 78 connected in series and the other the coils 79 and 80 in series, the two groups being connected in parallel with each other through a reversing switch 88. Calling attention to Fig. 10 let it be assumed that the current is flowing in the direction of the arrows shown at the upper part of the coils 77, 78. Coil 77 will produce a south and coil 78 a north pole. Assume further that the switch 88 is to the right coil 80 will then produce a south and coil 79 a north pole thus giving two pairs of poles. Now if the switch 88 is thrown to the left the direction of flow of current in coils 77 and 78 remains unchanged but the current in coils 79 and 80 is reversed so that the coil 79 now produces a south and the coil 80 a north pole. It is obvious from inspection of the lower part of Fig. 10 that there is now but one pair of poles. I do not wish to be restricted to any definite number of poles, one and two pairs being selected merely for the purpose of illustration.

The variable resistance O is connected in series with the winding 63 and the battery B the latter being preferably a secondary battery. I wish it to be understood that the variable resistance O is controlled by the controller 76 as are the other switching connections shown in Fig. 9.

The operation of this form of my invention is as follows: Assuming that the prime mover is running and it is desired to transmit motion to the shaft 72 the controller is thrown into such a position as to close the circuit of the winding 63 with a comparatively large amount of resistance in said circuit. The switches 88 and 89 are normally in position so as to give the large number of poles. Besides closing the circuit of winding 63 the controller 76 closes switches 85 and 87, and the generator G'' now supplies energy to device D'' to drive the rotor 68. Now to step the speed of shaft 72 up the switches 88 and 89 are thrown to the reverse position thereby halving the number of poles and thus practically doubling the speed of the rotor 68 and its shaft 72. It is to be remembered that the switching function just described is adapted to be accomplished by the controller 76.

Up to this point the member 65 has practically no rotative effect on the rotor 68 for the following reasons: As has been previously stated the initial current in winding 63 is comparatively small and hence the flux due to this coil is low initially. This small flux, while sufficient to excite field 62 to cause the generator G'' to generate its E. M. F. is practically uniformly distributed by the core of the element 68 of the device D''.

To speed the shaft 72 up still more the circuits are opened at 85, 87 by the controller and the resistance O is materially reduced so that the flux due to winding 63 is now so high that the shell like core of the element 68 cannot distribute it as it passes through the periphery of said element from or into (depending on the direction of flow of the current in winding 63) the poles of the member 65. As a consequence the flux will concentrate around the poles of member 65 and pass through the element 68 in tufts so that the rotation of the poles of said member will now cause the element 68 to rotate with them. Other methods of strengthening and weakening the M. M. F. due to coil 63 will readily suggest themselves to those skilled in the art.

The form of my invention illustrated in Fig. 5 possesses, in addition to the advantage of the other forms, the advantage that no sliding electrical contacts, such as commutators or slip rings, are used due to the fact that all of the windings of the machines are mounted on stationary parts.

Figs. 6 and 7 illustrate a slight modification of the form of my invention shown in Fig. 5.

As is obvious from inspection of Fig. 6 the form of invention illustrated in this figure differs from that shown in Fig. 5 in that the winding 63 is replaced by two windings 100, 101, the electrical connections and operation of which will be hereinafter described, and an annulus 105 of magnetic material and T shaped in cross-section is added. The windings 100 and 101 are located on opposite sides of the annulus and surround the portion 112 thereof which in turn surrounds the sleeve 104. The wiring diagram for the modification shown in Fig. 6 is identical with that shown in Fig. 9 except that the circuit, at the left of the latter figure, including the battery B, resistance O and winding 63 is replaced by that shown in Fig. 9'. In the last named figure the battery B', preferably a secondary one, is adapted to be connected to either of windings 100 or 101 by means of the switch 113 which switch is shown in a purely diagrammatic manner and its function can be performed by the same controller that connects the remaining circuits. The method of making the electrical connections for the transmission device shown in Fig. 6 is the same as that utilized in connection with the one illustrated in Fig. 5 except that instead of starting with coil 63 at low energization the coil 100 is placed in series with the battery and further instead of cutting out resistance at O when the switches 85 and 87 are opened as in Fig. 9 the winding 100 is cut out and winding 101 is cut into the battery circuit in Fig. 9'. One of the effects of this change is that instead of the magnetic flux for members 103 and 107 passing through sleeve 104, member 103, armature core 102, the frame of the machine, core 108 and element 107 as it would if a winding similar to winding 63 were utilized; there is a flux set up at first, by winding 100, through the annulus 105, sleeve 104, member 103, core 102 and the frame of the machine. It will be noticed that this flux does not pass through the translating device at the right of Fig. 6 but is merely for the generator at the left. When the generator circuit is opened the winding 100 is cut out, as has been described above, and winding 101 is cut in. The latter winding sets up a flux through annulus 105, sleeve 104, member 107, element 109, core 108 and the frame of the machine. This latter flux obviously does not pass through the generator parts but is merely for the purpose of magnetizing member 107 to cause the latter to rotate the element 109. In its essentials the transmission device shown in Fig. 6 is the same as that shown in Fig. 5. While the member 107 is shown as having two poles in Fig. 7, I do not wish to be restricted to the use of two poles as any suitable number of poles may be used.

Fig. 8 illustrates still another modification of the form of my invention illustrated in Fig. 5 in which the generator G'' is replaced by a machine Rc similar to a rotary converter, but differing slightly therefrom in the field windings as will hereinafter appear. The machine Rc comprises the usual field poles 123 of any suitable number, armature 124, commutator 125 and slip rings 126. Although I am aware that either one of the field or armature elements can be made rotatable I have shown, for the purpose of illustration, the field 123 stationary and the armature 124 fixed to the rotatable sleeve 127 which sleeve is similar to the sleeve 64 in Fig. 5 and 104 in Fig. 6. The field winding of the machine Rc is made of three sections as shown diagrammatically in Fig. 9''. The section 120 comprises a coil of a relatively large number of turns on each of the field poles 123 this being the usual field winding. The section 121 comprises coils one each mounted on alternate poles of the field 123 and the section 122 comprises coils mounted one each on the remaining poles. It will be noted that the section 121 is of fewer number of turns than section 122 and each of these sections is of a relatively small number of turns compared to the number of turns in section 120. I have illustrated the machine Rc as being a three-phase one although obviously any suitable number of phases could be employed. The dynamo-electric machine or translating device T is exactly similar to the device D'' shown in Fig. 5 the parts 128, 129 and 130 corresponding to parts 66, 68 and 65 respectively.

The electrical connections and operation of the form of my invention illustrated in Fig. 8 may best be understood by reference to Fig. 9''. As the connections of the primary of the machine T are identical to those shown at the right of Fig. 9 except that another phase is added these connections have been omitted from Fig. 9''. Conductors 131, 132 and 133 correspond to conductors 81 to 84 inclusive of Fig. 9. The operation for transmitting motion to shaft 136 (the driven shaft) is as follows: The switch 134 is closed and 135 open and the machine Rc supplies A. C. to the conductors 131, 132 and 133 the latter being the supply conductors for the primary of machine T which machine is started with the large number of primary poles as described in connection with Fig. 5. The machine T is then caused to speed up by any suitable method such as cutting down the number of primary poles as has been explained in connection with Fig. 5. To speed up rotating element 129 still more the lines 131, 132, 133 are opened, switch 134 is opened and switch 135 closed. Attention is called to the fact that two sections 121, 122 of the field are shown opposing each other, i. e., all of the field poles will now be of the same polarity but as one section contains more turns than the other, as has been previously pointed out, one set of alternate poles will be comparatively strong and the remaining intermediate poles will be comparatively weak, and as a consequence while there will be an E. M. F. generated in machine Rc it will be smaller in value than that generated when field 120 was energized. This E. M. F., however, is sufficient to furnish the necessary M. M. F. for the field poles 123 as the combined resistance of sections 121 and 122 is lower than that of section 120. Remembering that all of the field poles of machine Rc are now of the same polarity the path of flux will be through poles 123, armature 124, sleeve 127, member 130, element 129, core 128 and the frame 137. As the member 130 carries poles similar to those shown at 107 in Fig. 7 or 35 in Fig. 3 the flux will concentrate at these poles and the element 129 will be rotated by said member 130. As previously mentioned, the showing in Fig. 9'' is merely a diagrammatic one and in practice the switching operations would be performed by a suitable controller. As the particular type of controller does not form a part of this invention I have omitted detailed illustration thereof.

Although I have referred to that speed of the driven shaft which is practically equal to that of the driving shaft at full speed, I do not wish to be understood to say that the former shaft cannot be driven at a greater speed than the driving shaft with my transmission apparatus. Since, if desired, the rotating element of the translating device may be driven at a speed greater than the shaft of the generator by any suitable method. Thus, in the form shown in Fig. 1 by further weakening the field of the translating device to a predetermined extent when the latter is acting as a motor, the speed may be increased above that of the engine.

In accordance with the provisions of the patent statutes, I have herein described the principle of operation of my invention, together with the apparatus which I now consider to represent the best embodiments thereof, but I desire to have it understood that the apparatus shown is only illustrative and that the invention can be carried out by other means. Also, while it is designed to use the various features and elements in the combinations and relation described some of these may be altered and others omitted and some of the features of one form of the invention may be used in others without interfering with the more general results outlined, and the invention extends to such use.

Having described my invention what I claim and desire to secure by Letters Patent is:

1. In a transmission system for automotive vehicles, the combination with a prime mover, a generator coupled thereto and a second dynamo-electric machine electrically associated therewith including a part coupled to said prime mover, a part coupled to the load and a stationary part, said second mentioned part being adapted to operate as the rotor or armature for either the first or last named parts.

2. In a transmission system for automotive vehicles, the combination with a prime mover, a generator coupled thereto and a second dynamo-electric machine, electrically associated therewith including a part coupled to said prime mover, a part coupled to the load and a stationary part, said second mentioned part being adapted to operate as the rotor or armature for the last named part for low speeds and as the rotor or armature of the first named part for high speeds.

3. In a transmission system, a dynamo-electric machine comprising a field and an armature, one of which is rotatable with respect to the other, said dynamo-electric machine comprising also a member of magnetizable material rotatable with respect to both said field and said armature, means for passing magnetic flux through said armature and field only and means for passing magnetic flux through said field, armature and member of magnetizable material.

4. In a transmission system, in combination a dynamo-electric machine comprising a stationary element, an element rotatable with respect to said stationary element and a member rotatable with respect to both of said elements, a source of E. M. F., windings on one of said elements, means comprising said source of E. M. F. and said windings for creating a torque between said elements and means comprising said source of E. M. F. and said windings for creating a torque between said rotatable element and said member.

5. In a transmission system, in combination, a generator having a driven part, a translating device comprising a field element and an armature element one of which elements is rotatable and mechanically coupled to a member to be driven, a rotatable member of magnetic material, means including a mechanical connection between said driven generator part and rotatable member for driving said rotatable element at one rate of speed and means including connections between said generator and field element for driving said rotatable element at a different rate of speed.

6. In a transmission system, in combination, a generator having a driven part, a translating device comprising a field element and an armature element one of which elements is rotatable and mechanically coupled to a member to be driven, said translating device comprising also a rotatable member of magnetic material, said driven generator part and rotatable member being mechanically coupled, magnetizing means for said rotatable member, means on said rotatable element for causing the latter to be rotated by said rotatable member when the latter is magnetized and rotating, and switches and connections between said generator and said field and armature elements whereby said two last named elements may be operated as a motor with said generator as a source.

7. In a transmission system, in combination, a generator having a part adapted to be driven by a prime mover a translating device comprising a member of magnetic material rigidly connected to said part, a field element and an armature element, one of the said elements being independently rotatable with reference to said member, means for magnetizing said member, means including conductors on said rotatable element whereby said member when magnetized and rotated will rotate said rotatable element by magnetic drag, and switches and connections between said generator and said armature and field elements for operating the two last named elements as a motor with said generator as a source.

8. In a transmission system, in combination, a generator having a driven part, a dynamo-electric machine comprising a stationary element, a rotatable element and a member of magnetizable material rotatable with respect to said elements, means including a mechanical connection between said driven part and rotatable member for driving said rotatable element at one rate of speed and means including electrical connections between said generator and stationary element for driving said rotatable element at a different rate of speed.

9. In a transmission system, in combination, a generator having a driven part, a translating device comprising a field element and an armature element one of which elements is rotatable and mechanically connected to a member to be driven, said translating device comprising also a rotatable member of magnetic material, means connecting said generator and translating device so as to enable the said rotatable element to be driven at one speed by said rotatable member or at a different speed by said other element of the translating device.

10. In a transmission system, a translating device comprising a field, an armature and a rotatable member of magnetic material, means for energizing said field, changeable connections between said field and energizing means, for sending flux through said field, armature and member in one position of said connections and through said armature and field alone in another position of said connections.

11. In a transmission system, a dynamo-electric machine, comprising a field, armature and a rotatable member of magnetic material, means for causing a magnetic flux to pass through said field, armature and member and means for causing said flux to be diverted from said member.

12. In a transmission system, a dynamo-electric machine comprising a field, armature and a rotatable member of magnetic material, means including said field for passing magnetic flux only through said field and armature and means for changing the connections of said field for passing a magnetic flux through said field, armature and member.

13. In combination an electric motor, an element connected to said motor to be driven thereby, electrical connections for said motor, means for changing said connections and supplying a load to cause said motor to act as a generator to retard the rotation of said element and means for impressing a counter-electromotive force, less than the generated E. M. F. of said motor, on the field of the latter, when acting as a generator.

14. In a transmission system for automotive vehicles, the combination with a prime mover, a generator coupled thereto, a second dynamo-electric machine including a part coupled to said prime mover, a part coupled to the load and a stationary part, a secondary battery, means for charging said secondary battery by said generator, means for driving said generator as a motor with said battery to start said prime mover and means for causing said generator to supply energy to said machine.

15. In combination an electric motor, a rotatable element connected to said motor to be driven thereby, electrical connections for said motor, means for changing said connections and supplying a load to cause said motor to act as a separately excited generator to retard the rotation of said element and means for decreasing the E. M. F. across the field of the motor, when acting as a generator, by an amount less than the generated E. M. F.

16. In combination an electric motor, an element connected to said motor to be driven thereby, electrical connections for said motor, means for changing said connections and supplying a load to cause said motor to act as a generator to retard the rotation of said element and means including a portion of said load for impressing a counter-electro-motive force on the field of the motor, when acting as a generator, in proportion to the load current.

17. In combination an internal combustion engine, a dynamo-electric machine mechanically coupled to said engine, a translating device, an element mechanically coupled to said translating device to be driven thereby, electrical connections for supplying energy from said dynamo-electric machine to said translating device, a storage battery, means for charging said battery by said dynamo-electric machine at a voltage lower than that at which the energy is supplied to said translating device, means for driving said dynamo-electric machine as a motor with said storage battery as a source to start the engine, means for causing said translating device to exert a braking torque on said element and means for impressing a counter electro-motive force on a part of said translating device when it is acting as a brake.

18. In a transmission system, in combination a driving shaft, a dynamo comprising a field element and an armature element one of which is stationary and the other rotatable, a rotatable member of magnetic material having a central bore and mechanically coupled to said driving shaft, a mechanical connection between said rotatable element and said member whereby they rotate together, a second shaft extending into and journaled within the bore of said member, and a second dynamo having a rotatable part carried by said second shaft.

19. In a transmission system, a dynamo-electric machine comprising a field and armature, one of which is rotatable with respect to the other, said dynamo-electric machine comprising also a rotatable member of magnetizable material, means for passing magnetic flux through said armature and field only and means for passing magnetic flux through said armature and member of magnetizable material.

20. In a transmission system, in combination, a generator having a driven part, a translating device comprising a field element and an armature element one of which elements is rotatable and mechanically coupled to a member to be driven, said translating device comprising also a rotatable member of magnetic material, said driven generator part and rotatable member being mechanically coupled, magnetizing means for said rotatable member, means on said rotatable element for causing the latter to be rotated by said rotatable member when the latter is magnetized and rotating, switches and connections between said generator and said field and armature elements whereby said two last named elements may be operated as a motor with said generator as a source and means for reversing the direction of rotation of said rotatable element.

21. In a transmission system, in combination, a dynamo-electric machine comprising a stationary field having poles, an element rotatable with respect to said field and a member of magnetizable material rotatable with respect to both said field and said element, said rotatable element carrying both a D. C. armature winding and a squirrel cage induction motor winding, means including a source of E. M. F. and connections for operating said field and armature winding as a D. C. motor and means for changing the polarity of certain of the poles of said field to pass flux through the member of magnetizable material.

22. In a transmission system, a translating device comprising a field, a member of magnetic material, and an armature between said field and said member, said member being rotatable with reference to said field and armature, means for energizing said field, and changeable connections between said field and energizing means for sending flux through said field, armature and member in one position of said connections and through said armature and field alone in another position of said connections.

23. In a transmission system, a dynamo-electric machine, comprising a field, a member of magnetic material rotatable with relation thereto, and an armature between said field and said member, means for causing magentic flux to pass through said field, armature, and member, and means for causing said flux to be diverted from said member.

24. In a transmission system, a dynamo-electric machine comprising a field, a rotatable member of magnetic material, and an armature interposed between said member and said field, means including said field for passing magnetic flux only through said field and armature, and means for changing the connections of said field for passing magnetic flux through said field, armature, and member.

25. In a transmission system, a dynamo-electric machine comprising a field, a rotatable member of magnetizable material, and an armature interposed between said member and said field, means for passing magnetic flux through said armature and field only, and means for passing magnetic flux through said armature and member of magnetizable material.

26. In a transmission system for automotive vehicles comprising the combination with a prime mover, of a generator coupled thereto, a second dynamo-electric machine including a part coupled to said prime mover, a part coupled to the load and a stationary part, and an electrical connection between said generator and said stationary part.

27. In combination, a field element, a relatively rotatable armature element, a member of magnetizable material rotatable with respect to both said armature and field elements, means for energizing said field to cause magnetic flux to pass only through said field and armature, means for changing the connections of said field to cause magnetic flux to pass through said member, field and armature, and means forming a drive connection between one of said elements and said member when the latter is magnetized.

In testimony whereof I have affixed my signature.

HARRY L. TANNER.